United States Patent
Shaner et al.

(10) Patent No.: US 11,408,542 B2
(45) Date of Patent: Aug. 9, 2022

(54) CONDUIT FLUID COUPLING WITH ANTI-ROTATION LOCK

(71) Applicant: Rohr, Inc., Chula Vista, CA (US)

(72) Inventors: Kristopher B. Shaner, San Diego, CA (US); Jihad Ramlaoui, Chula Vista, CA (US); Aleksandar Ratajac, San Diego, CA (US); Colin R. Terrey, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 90 days.

(21) Appl. No.: 16/506,781

(22) Filed: Jul. 9, 2019

(65) Prior Publication Data
US 2021/0010624 A1    Jan. 14, 2021

(51) Int. Cl.
| | | |
|---|---|---|
| *F16L 19/00* | (2006.01) | |
| *F16L 23/02* | (2006.01) | |
| *F16L 15/04* | (2006.01) | |
| *F16L 19/06* | (2006.01) | |
| *F16L 19/025* | (2006.01) | |

(52) U.S. Cl.
CPC ............... *F16L 23/02* (2013.01); *F16L 15/04* (2013.01); *F16L 19/00* (2013.01); *F16L 19/025* (2013.01); *F16L 19/06* (2013.01); *F16L 2201/00* (2013.01)

(58) Field of Classification Search
CPC ........ F16L 19/005; F16L 19/025; F16L 19/06
USPC .......................................... 285/92, 354, 386
See application file for complete search history.

(56) References Cited

U.S. PATENT DOCUMENTS

| | | | |
|---|---|---|---|
| 3,747,288 A | 7/1973 | Grimelii | |
| 4,893,975 A | 1/1990 | Anthony | |
| 4,906,150 A | 3/1990 | Bennett | |
| 4,943,013 A | 7/1990 | Kapala et al. | |
| 5,312,139 A | 5/1994 | Marks | |
| 5,490,693 A | 2/1996 | Fisher et al. | |
| 10,012,258 B2 | 7/2018 | Lambert et al. | |
| 2007/0080310 A1* | 4/2007 | Lum | F16L 19/025 251/148 |
| 2007/0080311 A1* | 4/2007 | Lum | F16K 5/0626 251/148 |

(Continued)

FOREIGN PATENT DOCUMENTS

| | | | |
|---|---|---|---|
| JP | 2016038026 A | 3/2016 | |
| KR | 20170116787 A | 10/2017 | |
| WO | WO-9717562 A2 * | 5/1997 | ............. F16L 19/02 |

OTHER PUBLICATIONS

EP search report for EP19212458.4 dated May 4, 2020.

*Primary Examiner* — Matthew Troutman
*Assistant Examiner* — Fannie C Kee
(74) *Attorney, Agent, or Firm* — Getz Balich LLC

(57) ABSTRACT

A fluid conduit assembly is provided that includes a first conduit coupler, a second conduit coupler and a lock. The second conduit coupler is mated with the first conduit coupler at a threaded interface. The lock is configured to rotationally fix the first conduit coupler with the second conduit coupler. The lock includes a flange, a clip and a fastener. The flange is arranged with the first conduit coupler. The flange is configured with a plurality of flange apertures arranged circumferentially about an axis of the first conduit coupler. The clip is arranged with the second conduit coupler. The clip is configured with a clip aperture. The fastener is mated with the clip aperture and any one of the plurality of flange apertures.

20 Claims, 11 Drawing Sheets

(56) References Cited

U.S. PATENT DOCUMENTS

2008/0116688 A1* 5/2008 Bull .................. F16L 19/0225
                                                                   285/386
2013/0140809 A1   6/2013 Svensson
2015/0362108 A1  12/2015 Lefebvre

* cited by examiner

CONDUIT FLUID COUPLING WITH ANTI-ROTATION LOCK

BACKGROUND

1. Technical Field

This disclosure relates generally to a fluid conduit assembly and, more particularly, to a lockable fluid coupling for a fluid conduit assembly.

2. Background Information

A first fluid conduit may be fluidly coupled with a second fluid conduit through a fluid coupling. Various types and configurations of fluid couplings are known in the art. While these known fluid couplings have various benefits, there is still room in the art for improvement. There is a need in the art therefore for an improved fluid coupling for connecting fluid conduits.

SUMMARY OF THE DISCLOSURE

According to an aspect of the present disclosure, a fluid conduit assembly is provided that includes a first conduit coupler, a second conduit coupler and a lock. The second conduit coupler is mated with the first conduit coupler at a threaded interface. The lock is configured to rotationally fix the first conduit coupler with the second conduit coupler. The lock includes a flange, a clip and a fastener. The flange is arranged with the first conduit coupler. The flange is configured with a plurality of flange apertures arranged circumferentially about an axis of the first conduit coupler. The clip is arranged with the second conduit coupler. The clip is configured with a clip aperture. The fastener is mated with the clip aperture and any one of the plurality of flange apertures.

According to another aspect of the present disclosure, another fluid conduit assembly is provided that includes a first conduit coupler, a second conduit coupler and a lock. The lock is configured to rotationally fix the first conduit coupler with the second conduit coupler. The lock includes a first lock element, a second lock element and a latch. The first lock element is rotationally fixed to the first conduit coupler. The first lock element is configured with a plurality of catches arranged circumferentially about an axis of the first conduit coupler. The second lock element is rotationally fixed to the second conduit coupler. The latch is connected to the second lock element and is configured to mate with any one of the plurality of catches.

The fluid conduit assembly may be configured as a liquid conduit assembly.

The fluid conduit assembly may be configured as a gas conduit assembly.

The flange may be an arcuate flange that extends circumferentially about the first conduit coupler.

The first conduit coupler and the flange may be configured together as a monolithic body.

The fluid conduit assembly may also include a clamp clamped on the first conduit coupler. The flange may be connected to and project radially out from the clamp.

The clamp may include a first clamp segment and a second clamp segment attached to the first clamp segment by at least a second fastener. The first conduit coupler may be sandwiched between the first clamp segment and the second clamp segment. The first clamp segment and the flange may be configured together as a monolithic body.

The plurality of flange apertures may include a first flange aperture, a second flange aperture and a third flange aperture. The second flange aperture may be circumferentially between and adjacent the first flange aperture and the third flange aperture. The first flange aperture may be located $(((a\ quantity\ X)*\pi)/180)$ radians from the second flange aperture. The second flange aperture may be located $(((the\ quantity\ X+a\ quantity\ Y)*\pi)/180)$ radians from the third flange aperture.

The plurality of flange apertures may also include a fourth flange aperture. The third flange aperture may be circumferentially between and adjacent the second flange aperture and the fourth flange aperture. The third flange aperture may be located $(((the\ quantity\ X+(2*the\ quantity\ Y))*\pi)/180)$ radians from the fourth flange aperture.

The quantity X may be equal to fifteen.

The quantity Y may be equal to one.

The clip may be removably mounted to the second conduit coupler.

The clip may be configured with a multi-point aperture that at least partially corresponds to a multi-point shape having a quantity A of first points. The second conduit coupler may be configured with a multi-point body having a quantity B of second points. The quantity A may be equal to a product of the quantity B times an integer C. The multi-point body may be arranged within the multi-point aperture.

The integer C may be two or greater.

The clip aperture may be located $((((the\ quantity\ A)/2)*\pi)/180)$ radians from a peak of the multi-point aperture.

The clip aperture may be a channel.

The fluid conduit assembly may also include a first fluid conduit and a second fluid conduit. The first fluid conduit may be attached to the first conduit coupler. The second fluid conduit may be attached to the second conduit coupler. The second fluid conduit may be fluidly coupled with the first fluid conduit through a fluid coupling formed by the first conduit coupler and the second conduit coupler.

The first lock element may be configured as or otherwise include a flange. The plurality of catches may be configured as or otherwise include a plurality of flange apertures. The latch may be configured to project axially into any one of the plurality of flange apertures.

The second lock element may be configured as or otherwise include a clip that is removably attached to the second conduit coupler. The clip may be configured with a clip aperture. The latch may be mated with the clip aperture.

The first lock element may be configured as or otherwise include a flange. The plurality of catches may be configured as or otherwise include a plurality of detents in an outer radial periphery of the flange. The latch may be configured to project into any one of the plurality of detents.

The second lock element may be configured as or otherwise include a second flange. The latch may include a base and a tab. The base may be removably attached to the second flange. The tab may project out from the base and may be configured to project into any one of the plurality of detents.

The foregoing features and the operation of the invention will become more apparent in light of the following description and the accompanying drawings.

DETAILED DESCRIPTION

Figure 1:
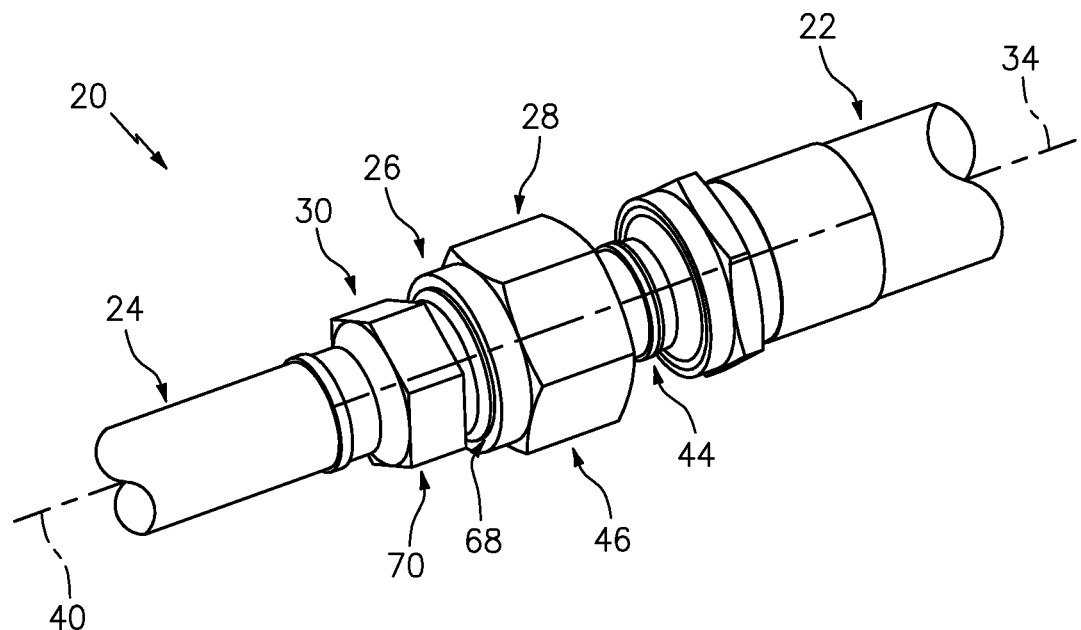
FIG. 1 is a perspective illustration of a portion of a fluid conduit assembly with a conduit fluid coupling.
Figure 2:
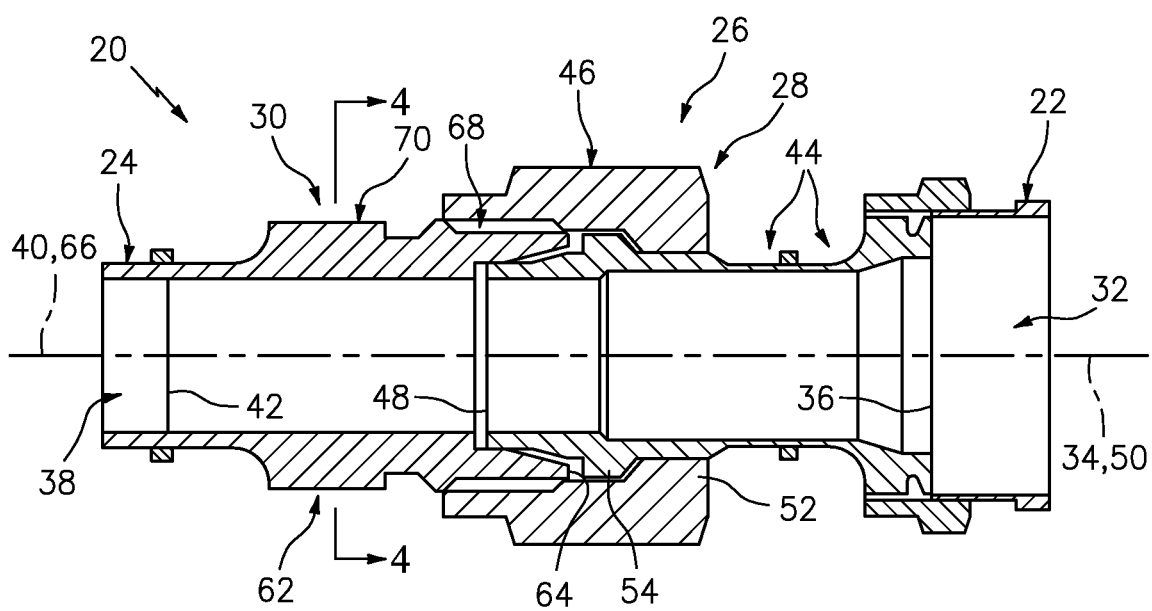
FIG. 2 is a side sectional illustration of a portion of the fluid conduit assembly.

FIGS. 1 and 2 illustrate a portion of a fluid conduit assembly 20. This fluid conduit assembly 20 includes a first fluid conduit 22, a second fluid conduit 24 and a conduit fluid coupling 26. The fluid coupling 26 is configured to fluidly couple the first fluid conduit 22 to the second fluid conduit 24. In the specific embodiment of FIGS. 1 and 2, the fluid coupling 26 includes a first conduit coupler 28 and a second conduit coupler 30.

Referring to FIG. 2, the first fluid conduit 22 may be configured as a length of flexible conduit (e.g., hose) or a length of rigid conduit (e.g., pipe). This first fluid conduit 22 is configured with an internal first flowpath 32 (e.g., bore), which first flowpath 32 extends longitudinally along a centerline 34 of the first fluid conduit 22 through the first fluid conduit 22 to an opening (e.g., an inlet/an outlet) at a distal end 36 of the first fluid conduit 22.

The second fluid conduit 24 may be configured as a length of flexible conduit (e.g., hose) or a length of rigid conduit (e.g., pipe). This second fluid conduit 24 is configured with an internal second flowpath 38 (e.g., bore), which second flowpath 38 extends longitudinally along a centerline 40 of the second fluid conduit 24 through the second fluid conduit 24 to an opening (e.g., an inlet/an outlet) at a distal end 42 of the second fluid conduit 24.

The first conduit coupler 28 is attached to the first fluid conduit 22 at its distal end 36. The first conduit coupler 28 may be configured as a female conduit coupler. The first conduit coupler 28 of FIG. 2, for example, includes a tubular body 44 and a threaded nut 46. The tubular body 44 is attached to the first fluid conduit 22 at the distal end 36. The tubular body 44 projects axially out from the distal end 36 of the first fluid conduit 22 to a distal end 48 of the tubular body 44 along a first axis 50 of the first conduit coupler 28, which first axis 50 may be coaxial with the first fluid conduit centerline 34. The threaded nut 46 is arranged with the tubular body 44. In particular, the threaded nut 46 circumscribes the tubular body 44 and a radially inward projecting annular rim 52 on the threaded nut 46 is positioned longitudinally between the first fluid conduit 22 and a radially outward projecting annular rim 54 on the tubular body 44.

Figure 3:
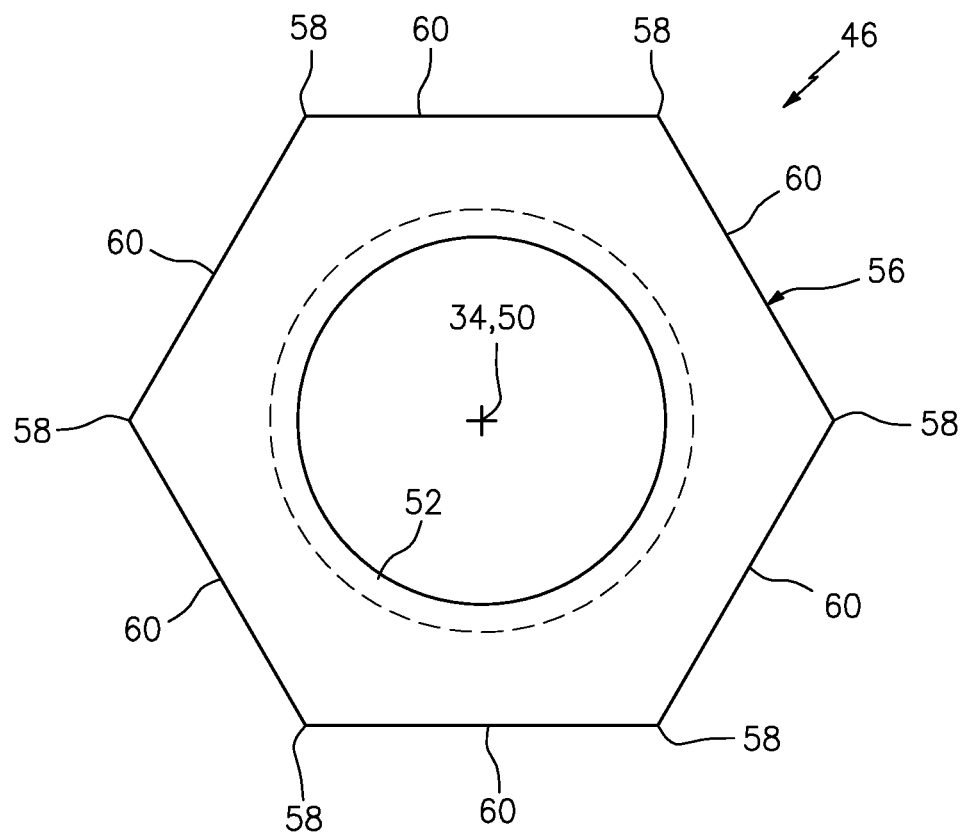
FIG. 3 is an end view illustration of a multi-point body of a first conduit coupler for the conduit fluid coupling.

The threaded nut 46 is configured as a multi-point threaded nut. The threaded nut 46 of FIG. 3, for example, is configured with a multi-point body 56; e.g., a hexagonal body. This multi-point body 56 has a polygonal cross-sectional geometry when viewed in a plane perpendicular to the first axis 50; e.g., parallel to the plane of FIG. 3. This polygonal cross-sectional geometry may be a hexagonal cross-sectional geometry (e.g., the threaded nut 46 may have a six point body) as shown in FIG. 3. The present disclosure, however, is not limited to such an exemplary hexagonal cross-sectional geometry. The multi-point body 56 of FIG. 3 is configured with a plurality of points 58 (e.g., peaks) arranged circumferentially about the first axis 50. Each of these points 58 is formed at a respective radially outer intersection between two circumferentially adjacent surfaces 60 of the threaded nut 46. In the embodiment of FIG. 3, each point 58 is relatively sharp such that the adjacent surfaces 60 meet at a sharp edge. However, in other embodiments, one or more of the points 58 may alternatively be, for example, blunt such that the adjacent surfaces 60 meet at a curved or beveled corner.

Referring to FIG. 2, the second conduit coupler 30 is attached to the second fluid conduit 24 at its distal end 42. The second conduit coupler 30 may be configured as a male conduit coupler. The second conduit coupler 30 of FIG. 2, for example, includes a tubular body 62 attached to the second fluid conduit 24 at the distal end 42. The tubular body 62 projects axially out from the distal end 42 of the second fluid conduit 24 to a distal end 64 of the tubular body 62 along a second axis 66 of the second conduit coupler 30, which second axis 66 may be coaxial with the second fluid conduit centerline 40. The second axis 66 is also coaxial with the first axis 50 when the couplers 28 and 30 are mated together.

Figure 4:
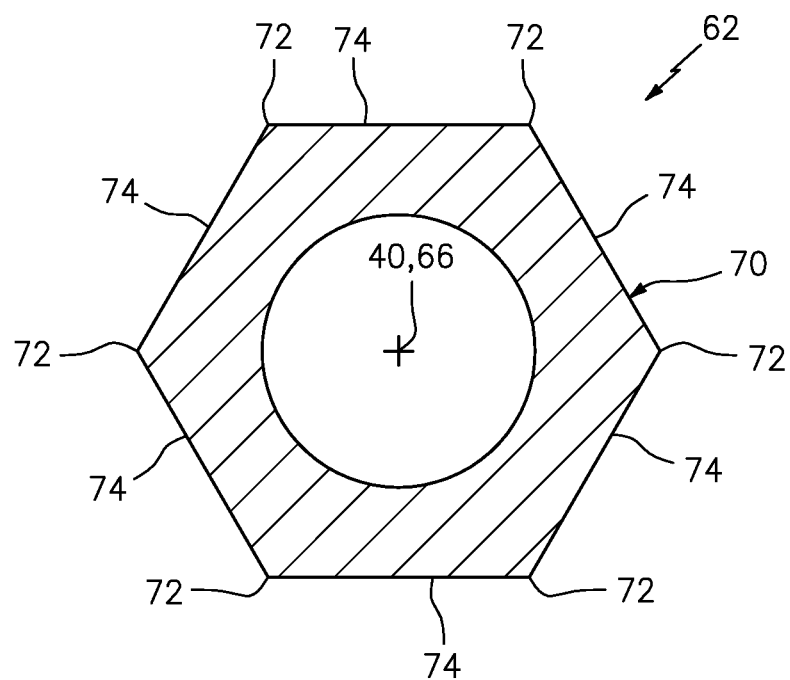
FIG. 4 is a cross-sectional illustration of a multi-point portion of a second fluid coupler for the conduit fluid coupling taken along line 4-4 in FIG. 2.

The tubular body 62 includes a threaded portion/body 68 at (e.g., on, adjacent or proximate) the distal end 64, and a multi-point portion/body 70 (e.g., a hexagonal portion/body) axially between the threaded portion 68 and the second fluid conduit 24. The multi-point portion 70 of FIG. 4 has a polygonal cross-sectional geometry when viewed in a plane perpendicular to the second axis 66; e.g., the plane of or parallel to FIG. 4. This polygonal cross-sectional geometry may be a hexagonal cross-sectional geometry (e.g., the second conduit coupler 30 may be configured with a six point body) as shown in FIG. 4. The present disclosure, however, is not limited to such an exemplary hexagonal cross-sectional geometry. The multi-point portion 70 of FIG. 4 is configured with a plurality of points 72 (e.g., peaks) arranged circumferentially about the first axis 50. Each of these points 72 is formed at a respective radially outer intersection between two circumferentially adjacent surfaces 74 of the multi-point portion 70. In the embodiment of FIG. 4, each point 72 is relatively sharp such that the adjacent surfaces 74 meet at a sharp edge. However, in other embodiments, one or more of the points 72 may alternatively be, for example, blunt such that the adjacent surfaces 74 meet at a curved or beveled corner.

Referring to FIG. 2, during assembly of the fluid conduit assembly 20, the second conduit coupler 30 is mated with the first conduit coupler 28 at a threaded interface defined between the first conduit coupler 28 and the second conduit coupler 30. A distal end portion of the tubular body 44, for example, is inserted into the tubular body 62 at the distal end 64. The threaded nut 46 is then mated with (e.g., threaded onto) the threaded portion 68. Tools such as wrenches may be mated with the multi-point body 56 and the multi-point portion 70 in order to tighten the threaded interface to a specified torque.

Under certain conditions such as when the fluid conduit assembly 20 is subject to vibrations and/or thermal expansion and contraction, the threaded nut 46 may back off (e.g., unthread from) the threaded portion 68 of the second conduit coupler 30. Such backing off may lead to a fluid leak at the threaded interface or may even lead to complete decoupling of the first conduit coupler 28 from the second conduit coupler 30. To prevent such backing off/decoupling, the fluid conduit assembly 20 is further configured with a fluid coupling lock 76 (e.g., anti-rotation lock) as illustrated, for example, in FIGS. 5 to 7.

The fluid coupling lock 76 is configured to rotationally fix the first conduit coupler 28 with the second conduit coupler 30. The fluid coupling lock 76 is thereby configured to prevent (or significantly limit) relative movement (e.g., rotation) between the first conduit coupler 28 and the second conduit coupler 30. The fluid coupling lock 76 includes a first lock element 78, a second lock element 80 and at least one latch 82 configured to selectively connect the first lock element 78 with the second lock element 80.

Figure 5:
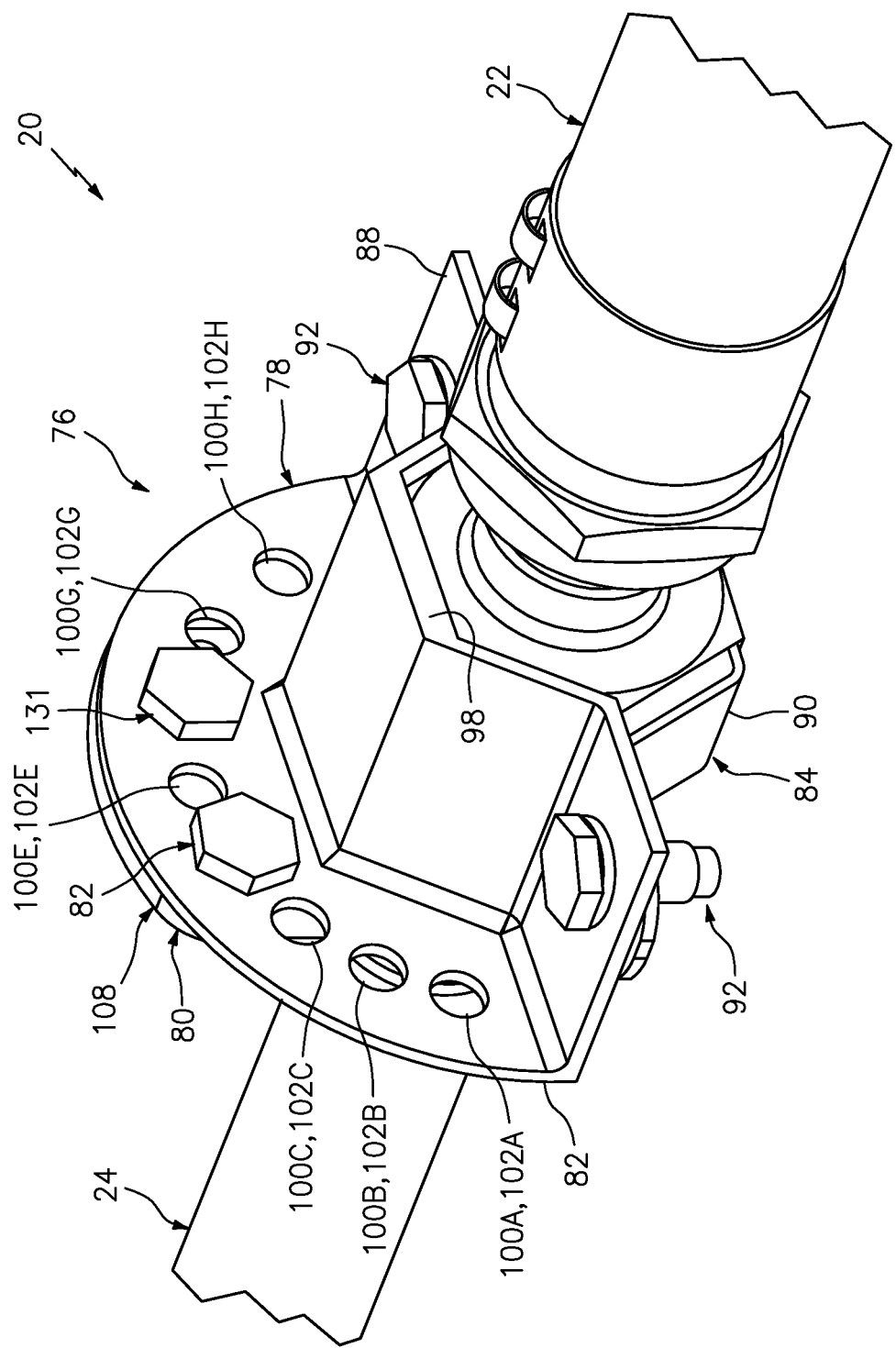
FIGS. 5 and 6 are perspective illustrations of a portion of the fluid conduit assembly configured with a fluid coupling/anti-rotation lock.
Figure 6:
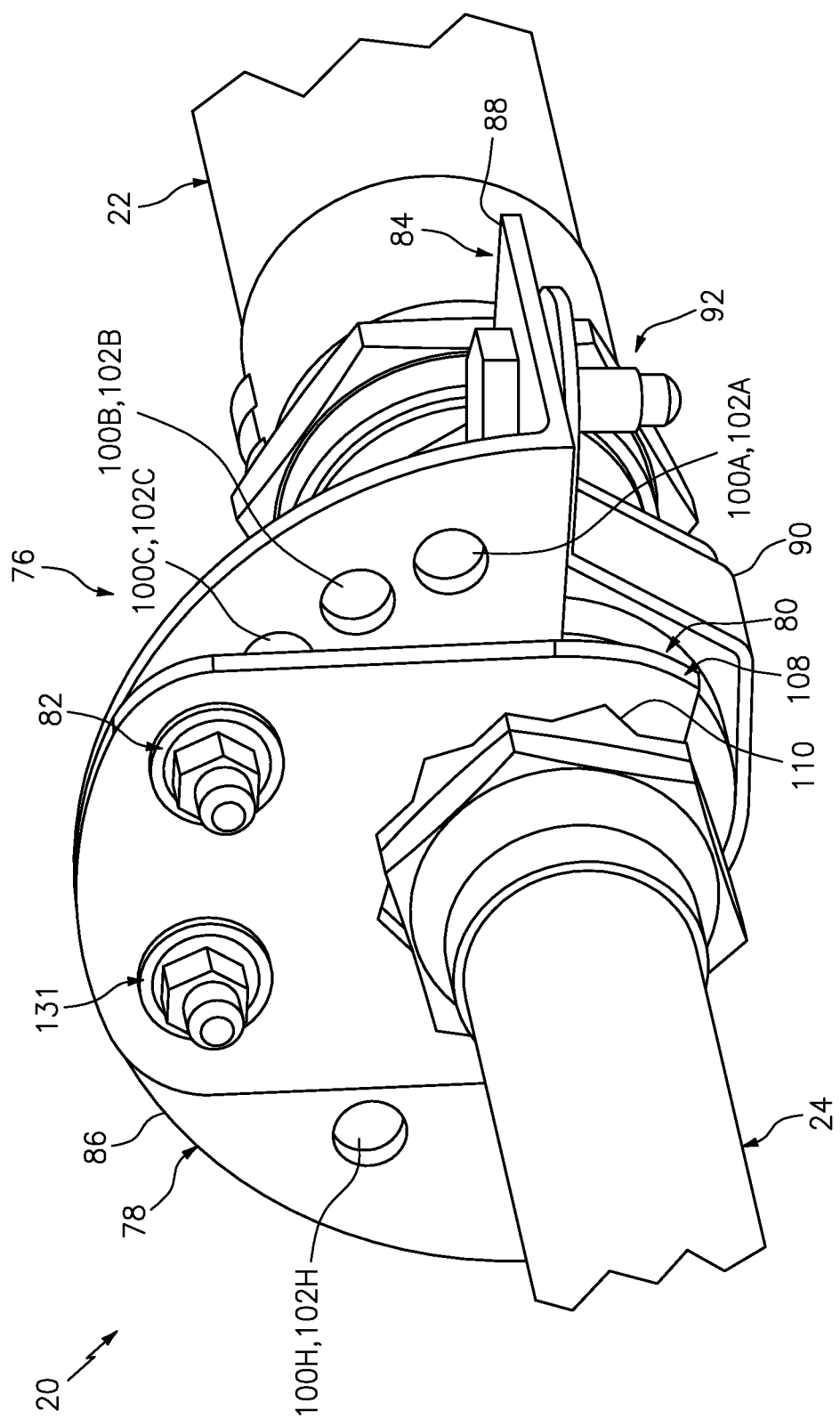
Figure 7:
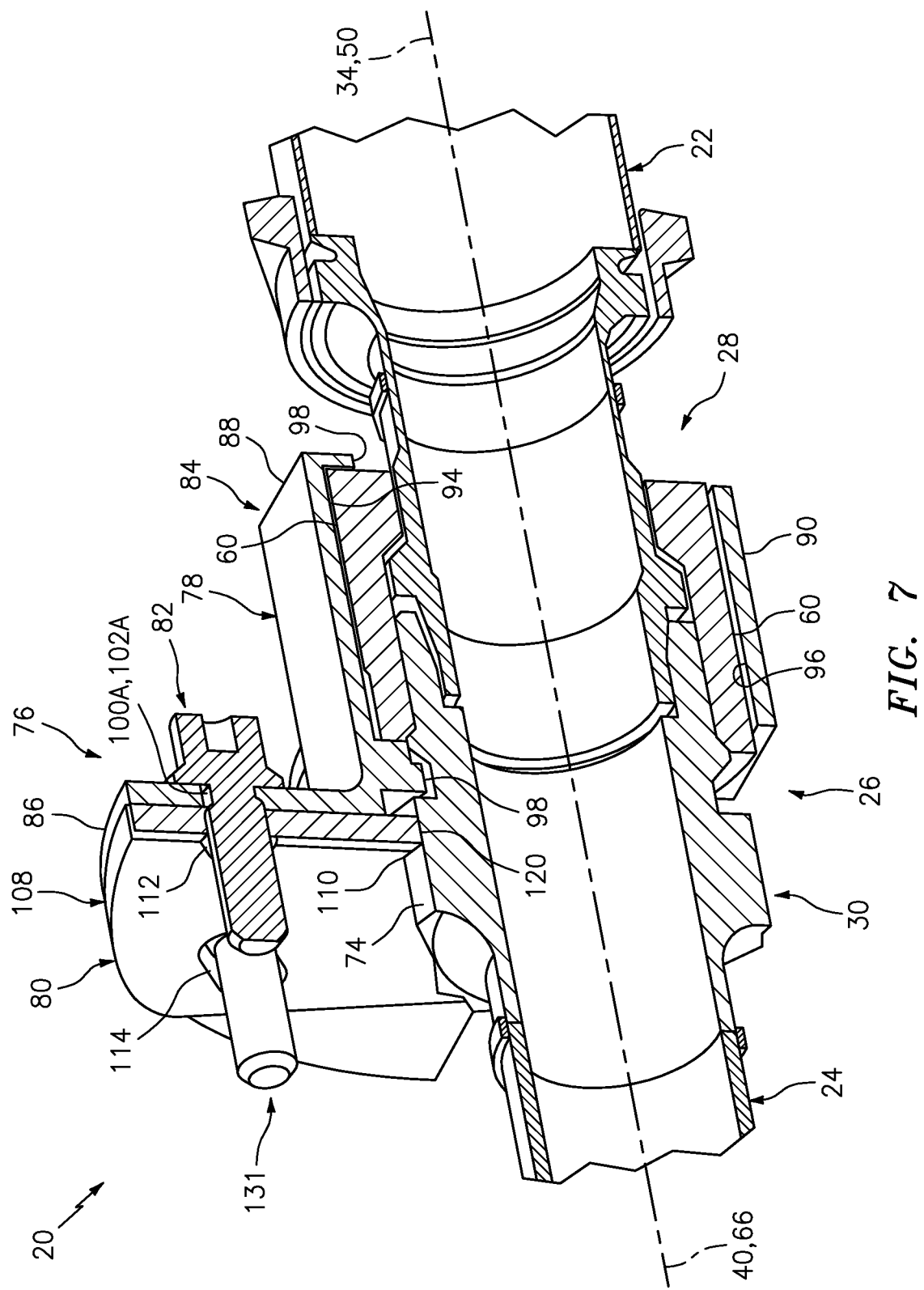
FIG. 7 is a perspective side sectional illustration of a portion of the fluid conduit assembly configured with the fluid coupling/anti-rotation lock.
Figure 8:
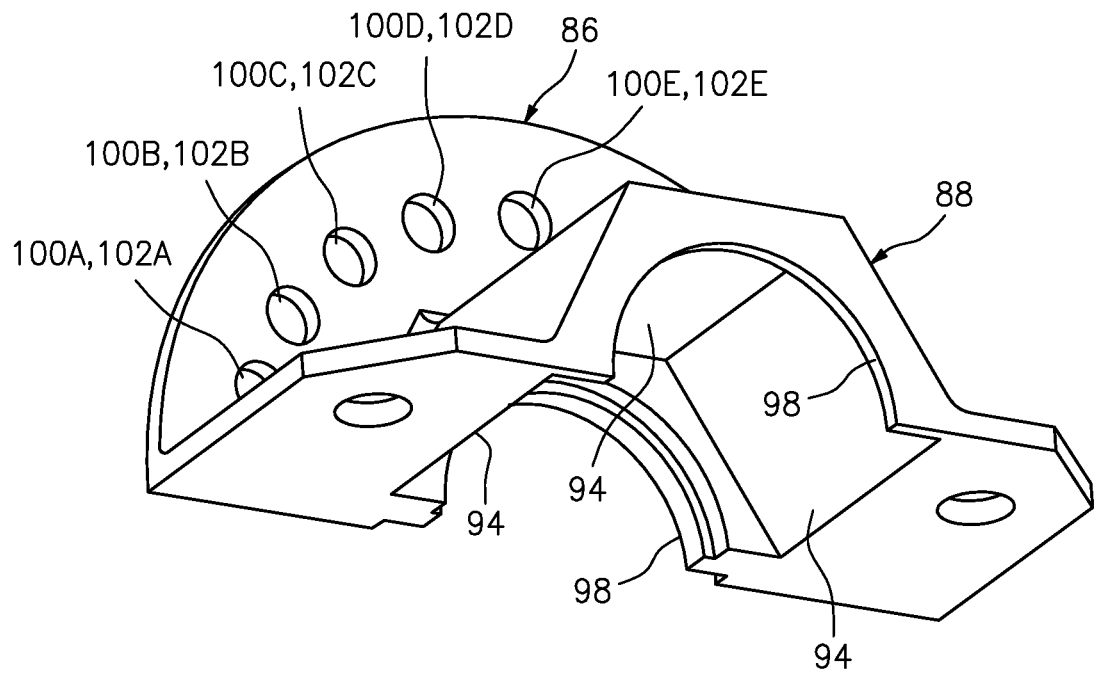
FIG. 8 is a perspective illustration of a first segment of a first lock element for the fluid coupling/anti-rotation lock.
Figure 9:
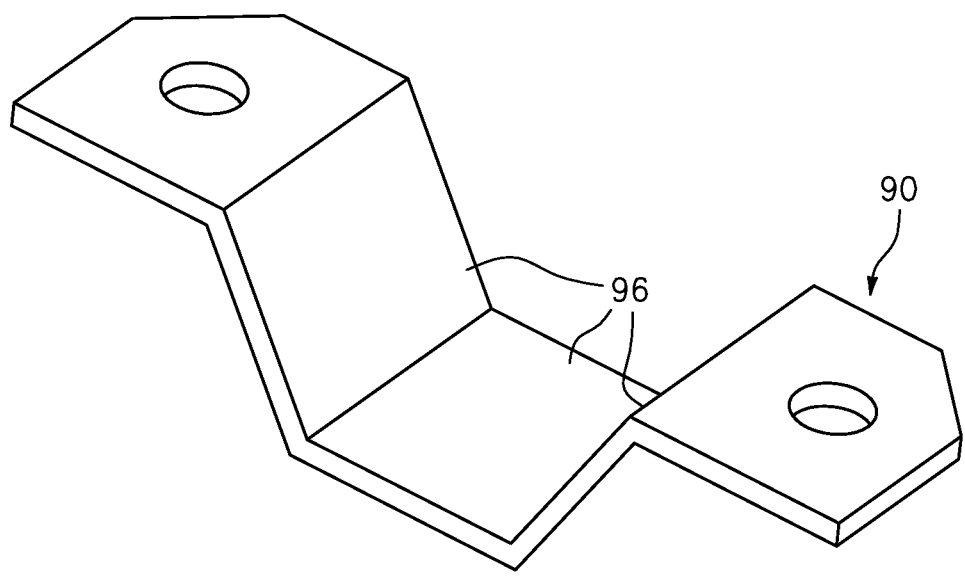
FIG. 9 is a perspective illustration of a second segment of the first lock element for the fluid coupling/anti-rotation lock.

The first lock element 78 of FIGS. 5 to 7 includes a clamp 84 and a flange 86; e.g., an arcuate flange. The clamp 84 is configured to clamp on the first conduit coupler 28 and, more particular, to clamp on the threaded nut 46. The clamp 84 of FIGS. 5 to 7, for example, includes a first clamp segment 88 (see FIG. 8) and a second clamp segment 90 (see FIG. 9). The second clamp segment 90 is configured to be attached to the first clamp segment 88 by one or more fasteners 92; e.g., nuts and bolts. The first conduit coupler 28 may thereby be sandwiched between the first clamp segment 88 and the second clamp segment 90.

To prevent relative rotation between the clamp 84 and the threaded nut 46, the first clamp segment 88 and/or the second clamp segment 90 may each be configured with one or more flats 94, 96 (see also FIGS. 8 and 9) that respectively engage the surfaces 60 of the threaded nut 46 (see also FIG. 3). The flats 94 and 96 of the clamp segments 88 and 90, for example, may be arranged to provide the clamp 84 with a bore having a polygonal cross-sectional geometry that substantially matches the cross-sectional geometry of the multi-point body 56 of FIG. 3.

To prevent relative axial movement (e.g., translation) between the clamp 84 and the threaded nut 46, at least one of the clamp segments such as the first clamp segment 88 may be configured with one or more axial locating features 98; e.g., rims. These axial locating features 98 are configured to be disposed on opposing axial ends of and axially engage (e.g., contact) the threaded nut 46.

The flange 86 is connected to (e.g., formed integral with or otherwise attached to) the clamp 84. In the specific embodiment of FIGS. 5 to 8, the flange 86 and the first clamp segment 88 are formed together as a monolithic body. The term "monolithic" is used herein to describe a single, unitary body formed (e.g., additively manufactured, machined and/or cast) as a single mass of material. A non-monolithic body, by contrast, includes discretely formed bodies which are mechanically fastened, bonded (e.g., welded, brazed and/or adhered) and/or otherwise attached together.

The flange 86 is cantilevered from the first clamp segment 88. The flange 86, for example, projects radially out from the first clamp segment 88 to an outer radial distal flange edge. The flange 86 extends circumferentially about the first axis 50 between opposing flange ends. The flange 86 may be arranged perpendicular to the first axis 50.

The flange 86 of FIGS. 5 to 8 is configured with a plurality of catches 100A-100H (generally referred to as "100"). Each of these catches 100 is configured as a flange/clocking aperture 102A, 102B, 102C, 102D, 102E, 102F, 102G, 102H (generally referred to as "102"); e.g., a circular through-hole. Each flange aperture 102 extends axially through the flange 86 along the first axis 50 between axially opposing surfaces of the flange 86. The flange apertures 102 are arranged circumferentially about the first axis 50 in an arcuate array.

Figure 10:
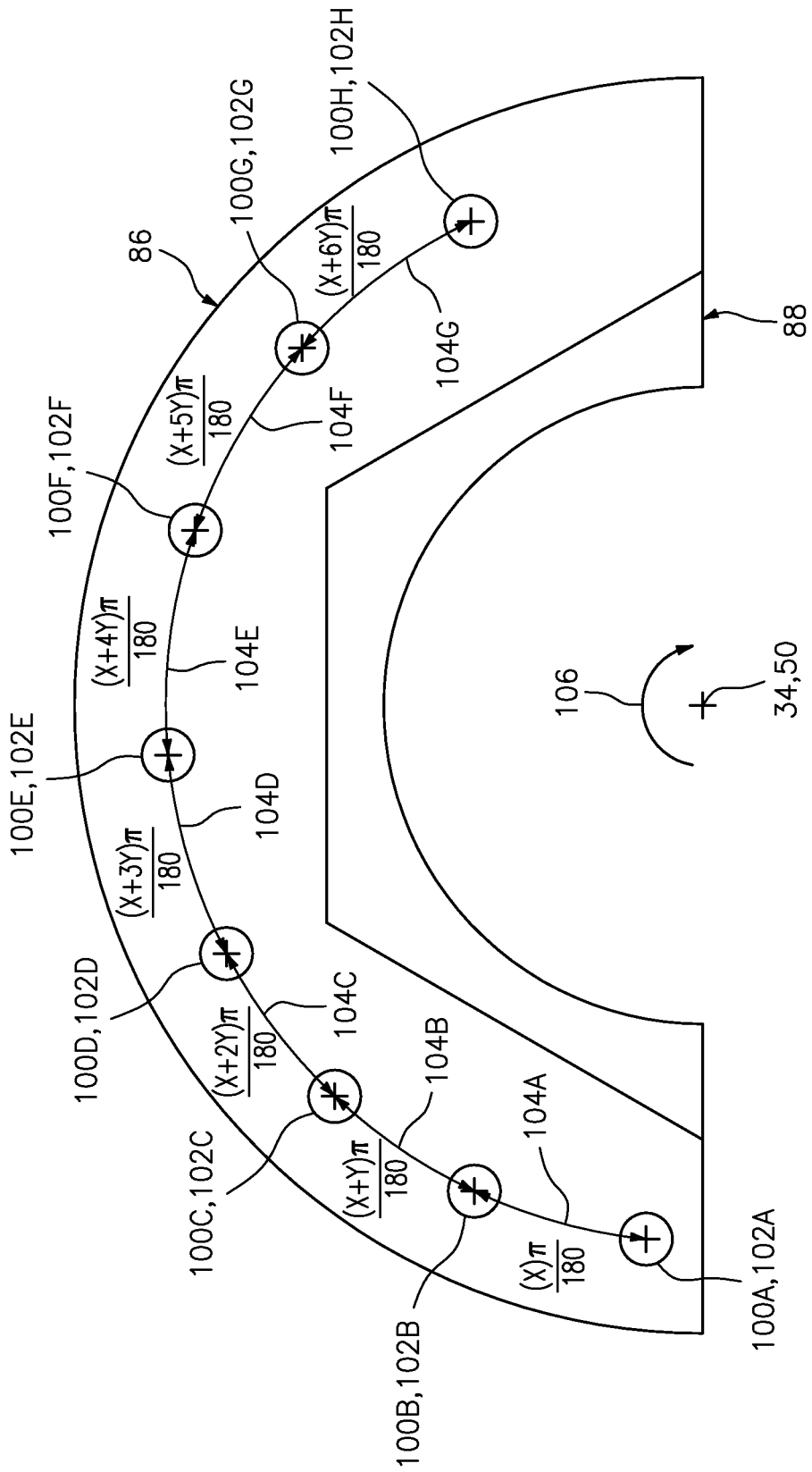
FIG. 10 is an end view illustration of the first segment of the first lock element.

Referring to FIG. 10, the flange apertures may be progressively circumferentially spaced such that a circumferential spacing 104A-104G (generally referred to as "104") between (e.g., centers of) adjacent flange apertures (e.g., 102A and 102B, 102B and 102C, 102C and 102D, 102D and 102E, 102E and 102F, 102F and 102G, 102G and 102H) progressively and, for example, uniformly increases as the flange 86 extends in a first circumferential direction 106 about the first axis 50. For example, the second flange aperture 102B is disposed circumferentially between and circumferentially adjacent the first flange aperture 102A and the third flange aperture 102C. The first flange aperture 102A may be located $(((a \text{ quantity } X)*\pi)/180)$ radians (the spacing 104A) from the second flange aperture 102B. The second flange aperture 102B, by contrast, may be located $(((\text{the quantity } X+a \text{ quantity } Y)*\pi)/180)$ radians (the spacing 104B) from the third flange aperture 102C. Similarly, the third flange aperture 102C is disposed circumferentially between and circumferentially adjacent to the second flange aperture 102B and the fourth flange aperture 102D. The third flange aperture 102C may be located $(((\text{the quantity } X+(2*\text{the quantity } Y))*\pi)/180)$ radians (the spacing 104C) from the fourth flange aperture 102D, and so on for the remaining spacings 104D-104G. The present disclosure, of course, is not limited to such an exemplary circumferential spacing. In particular, the circumferential spacing 104 may be selected based on the specific situation in which the fluid conduit assembly 20 is being used. For example, any circumferential spacing 104 may be used such that the clamp can be aligned with any peak on the (e.g., hexagonal) threaded nut 46, which nut may have any number of peaks greater than one; e.g., six peaks.

The quantity X may be selected such that adjacent flange apertures (e.g., 102A and 102B, 102B and 102C, 102C and 102D, 102D and 102E, 102E and 102F, 102F and 102G, 102G and 102H) are relatively close to one another. For example, the quantity X may be equal to about fifteen degrees, which relates to an angle between rays from the first axis 50 to the centers of a respective adjacent pair of flange apertures (e.g., 102A and 102B, 102B and 102C, 102C and 102D, 102D and 102E, 102E and 102F, 102F and 102G, 102G and 102H). Of course, in other embodiments, the quantity X may be greater than 15 degrees (e.g., 16, 17, 18, 29, 20, etc. degrees) or less than 15 degrees (e.g., 14, 13, 12, 11, 10, etc. degrees).

The quantity Y may be selected as any suitable number. For example, the quantity Y may be equal to one (1). Of course, in other embodiments, the quantity Y may be greater than one (e.g., 1.25, 1.5, 1.75, 2, etc.) or less than one (e.g., 0.75, 0.5, 0.25, etc.).

The second lock element 80 of FIGS. 5 to 7 and 11 is configured as a locking clip 108. This clip 108 is configured with a multi-point aperture 110 and one or more clip apertures 112 and 114.

The multi-point aperture 110 is configured as a multi-point channel. The multi-point aperture 110 of FIG. 11, for example, extends radially into the clip 108 and axially through the clip 108 along the second axis 66 between axially opposing surfaces of the clip 108. Of course, in other embodiments, the multi-point aperture 110 may alternatively be configured as a multi-point through-hole.

Figure 11:
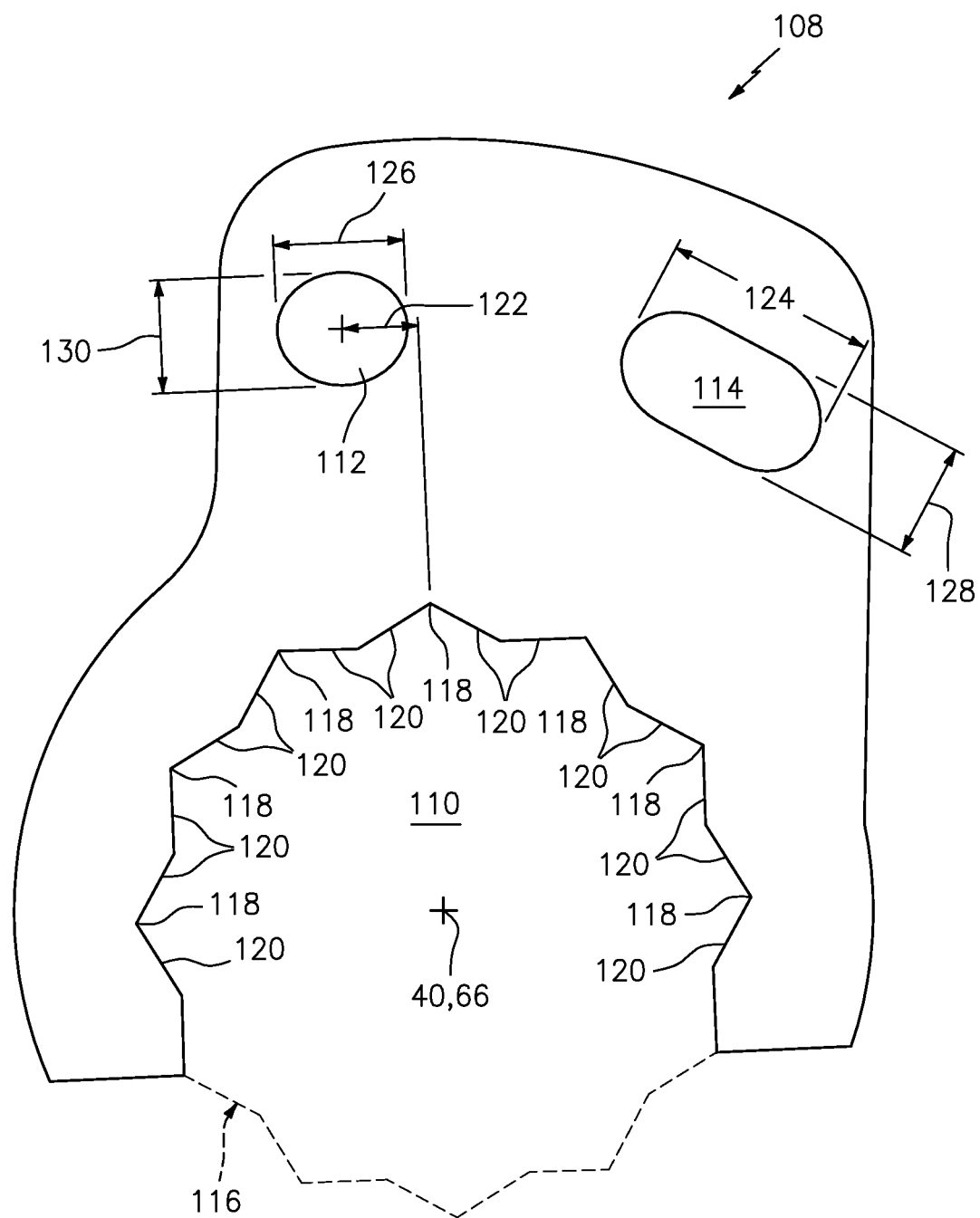
FIG. 11 is an end view illustration of a second lock element for the fluid coupling/anti-rotation lock.

The multi-point aperture 110 of FIG. 11 is configured with a polygonal cross-sectional geometry when viewed in a plane perpendicular to the second axis 66; e.g., a plane parallel to FIG. 11. This polygonal cross-sectional geometry is sized and shaped such that the multi-point aperture 110 conforms to and is operable to receive the multi-point portion 70 of the second conduit coupler 30 when assembled (e.g., see FIGS. 5 to 7). For example, the polygonal cross-sectional geometry of FIG. 11 at least partially corresponds to (e.g., matches) a multi-point shape 116 such as, but not limited to, a bi-hexagonal shape. More particularly, the polygonal cross-sectional geometry of FIG. 11 (if extended completely around the second axis 66; see dashed line) is a bi-hexagonal cross-sectional geometry (e.g., a twelve point aperture). The multi-point shape 116/the fully extended polygonal cross-sectional geometry of the multi-point aperture 110 is configured with a quantity A of points 118 (e.g., aperture peaks, clip concavities) arranged circumferentially about the second axis 66. The quantity A may be a non-zero integer. For example, the quantity A is equal to twelve in the embodiment of FIG. 11. Each of the points 118 is formed at a respective radially outer intersection between two circumferentially adjacent interior surfaces 120 (e.g., flats) of the clip 108. In the embodiment of FIG. 11, each point 118 is relatively sharp such that the adjacent surfaces 120 meet at a sharp edge. However, in other embodiments, one or more of the points 118 may alternatively be, for example, blunt such that the adjacent surfaces 120 meet at a curved or beveled corner.

The quantity A may be selected based on a quantity B of the peaks 72 of the multi-point portion 70 of the second conduit coupler 30; see FIG. 4. For example, the quantity A may be equal to a product of the quantity B (e.g., six) times an integer C. In the specific embodiment of FIG. 11, the integer C is equal to two such that the quantity A is equal to twelve (6 points×2=12). However, in other embodiments, the integer C may be equal to one (1), three (3), four (4), etc.

The first clip aperture 112 of FIG. 11 is configured as a slot; e.g., an oval/circumferentially elongated slot. However, in other embodiments, the first clip aperture 112 may be configured as a circular through hole. The first clip aperture 112 extends axially through the clip 108 along the second axis 66 between axially opposing surfaces of the clip 108. The first clip aperture 112 is located radially outward, relative to the second axis 66, from the multi-point aperture 110. The first clip aperture 112 may be located ((((the quantity A)/2)*π)/180) radians (spacing 122) from a circumferentially adjacent one of the peaks 118 of the multi-point aperture 110. With such a spacing relative to the adjacent peak 118, the clip 108 may be flipped to provide a ((the quantity A)/2) degree rotational shift; e.g., a 7.5 degree rotational shift. In other words, the foregoing first clip aperture 112 location enables additional adjustability as described below when the clip 108 is flipped.

The second clip aperture 114 of FIG. 11 is configured as a slot; e.g., an oval/circumferentially elongated slot. However, in other embodiments, the second clip aperture 114 may be configured as a circular through hole. The second clip aperture 114 extends axially through the clip 108 along the second axis 66 between axially opposing surfaces of the clip 108. The second clip aperture 114 is located radially outward, relative to the second axis 66, from the multi-point aperture 110. A length 124 of a major axis of the second clip aperture 114 may be greater than a length 126 of a major axis of the first clip aperture 112. A length 128 of a minor axis of the second clip aperture 114 may be equal to a length 130 of a minor axis of the first clip aperture 112.

Referring to FIGS. 5 to 7, the clip 108 is mated with the multi-point portion 70 of the second conduit coupler 30. In particular, the multi-point portion 70 is inserted into the multi-point aperture 110 such that respective surfaces 120 of the aperture 110 engage (e.g., contact) respective surfaces 74 of the multi-point portion 70 (see FIG. 7). The relative position of the clip 108 to the flange 86 is selected such that the latch 82 (e.g., a fastener) may be mated with (e.g., project into) the first clip aperture 112 and a respective one of the flange apertures 102. Note, depending upon the relative rotational position between the threaded nut 46 and the second conduit coupler 30, the latch 82 may project into any one of the flange apertures 102. Furthermore, the relative orientation of the clip 108 may be changed (e.g., the clip 108 may be flipped) in order to ensure the latch 82 may be mated with the first clip aperture 112 and the respective flange aperture 102 without (or with minimal) tightening or loosening the threaded interface between the couplers 28 and 30.

The lock 76 may include a second latch 131 (e.g., a fastener) which mates with the second clip aperture 114 and another one of the flange apertures 102.

Figure 12:
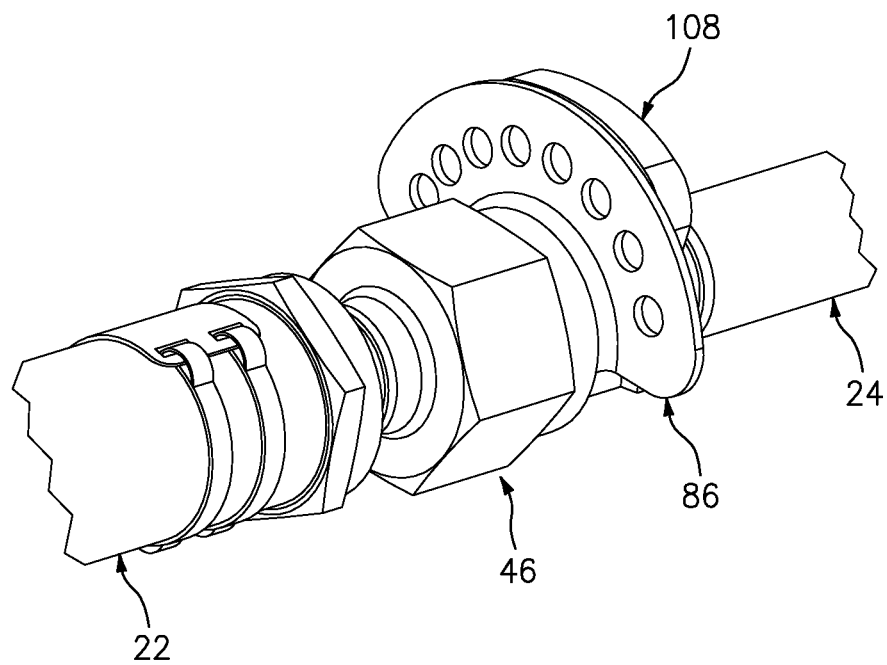
FIGS. 12 and 13 are perspective illustrations of a portion of the fluid conduit assembly configured with another fluid coupling/anti-rotation lock.
Figure 13:
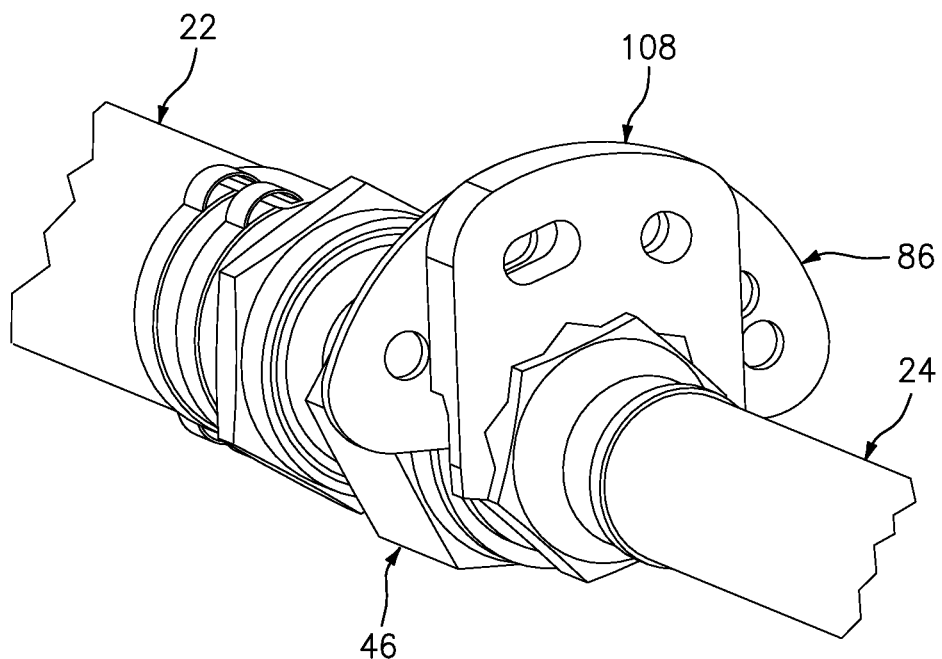

In some embodiments, referring to FIGS. 12 and 13, the flange 86 and the threaded nut 46 may be configured as a monolithic body. With such a configuration, the clamp 84 as described above is omitted.

Figure 14:
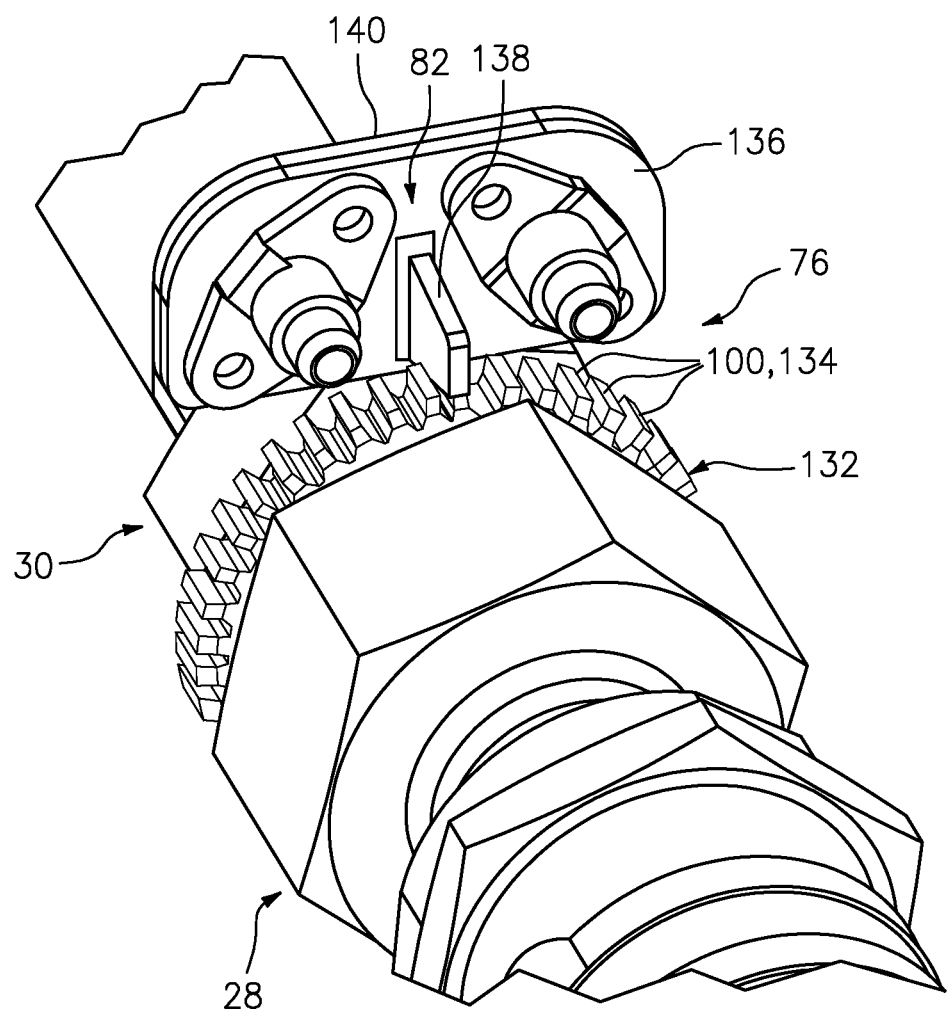
FIGS. 14 and 15 are perspective illustrations of a portion of the fluid conduit assembly configured with still another fluid coupling/anti-rotation lock.
Figure 15:
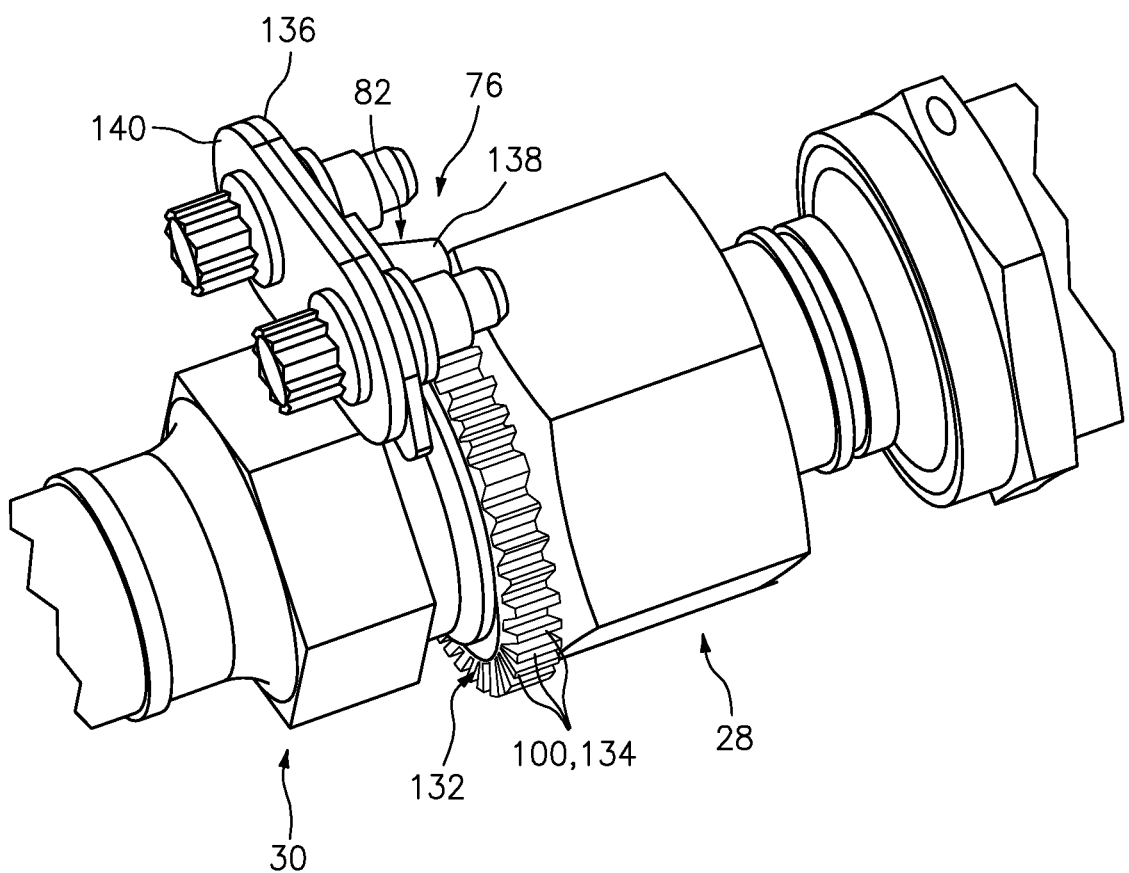

FIGS. 14 and 15 illustrate another embodiment of the lock 76. In this embodiment, the first lock element 78 is configured as an annular (or arcuate) flange 132 (e.g., a splined rim) with a plurality of detents 134 (e.g., catches 100); e.g., notches or channels. The detents 134 are arranged in a circular (or arcuate) array and located in an outer radial periphery of the flange 132. Each of these detents 134 is capable of mating with the latch 82. Here, the latch 82 includes a base 136 and a tab 138 which projects axially out from the base 136 and into a respective one of the detents 134. The base 136 is connected (e.g., mechanically fastened via one or more fasteners) to the second lock element 80. The second lock element 80 is configured as a flange 140 arranged with the second conduit coupler 30. This flange 140 and the second conduit coupler 30 may be configured as a monolithic body. Similarly, the flange 132 and the first conduit coupler 28 may be configured as a monolithic body. Of course, in other embodiments, the flange 140 may be mechanically attached and/or otherwise arranged with the second conduit coupler 30. In addition or alternatively, the flange 132 may be mechanically attached and/or otherwise arranged with the first conduit coupler 28.

The first lock element 78 and the second lock element 80 are described above as being respectively arranged with the first conduit coupling 28 and the second conduit coupling 30. However, in other embodiments, the first lock element 78 and the second lock element 80 may be respectively arranged with the second conduit coupling 30 and the first conduit coupling 28.

In some embodiments, the fluid conduit assembly 20 may be configured as part of an aircraft propulsion system. The fluid conduit assembly 20, for example, may be configured to direct liquid and/or gaseous fluid between different components of the aircraft propulsion system. Examples of such fluids include, but are not limited to, fuel, lubricant, coolant and air. The present disclosure, however, is not limited to such an exemplary aircraft propulsion system application.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A fluid conduit assembly, comprising:
    a first conduit coupler;
    a second conduit coupler mated with the first conduit coupler at a threaded interface;
    a lock configured to rotationally fix the first conduit coupler with the second conduit coupler, the lock including a flange, a clip and a fastener; and
    a clamp clamped on the first conduit coupler;
    the flange arranged with the first conduit coupler, the flange configured with a plurality of flange apertures arranged circumferentially about an axis of the first conduit coupler, and the flange connected to and projecting radially out from the clamp;
    the clip arranged with the second conduit coupler, and the clip configured with a clip aperture; and
    the fastener mated with the clip aperture and any one of the plurality of flange apertures.

2. The fluid conduit assembly of claim 1, wherein the flange is an arcuate flange that extends circumferentially about the first conduit coupler.

3. The fluid conduit assembly of claim 1, wherein the first conduit coupler and the flange are configured together as a monolithic body.

4. The fluid conduit assembly of claim 1, wherein
    the clamp includes a first clamp segment and a second clamp segment attached to the first clamp segment by at least a second fastener;
    the first conduit coupler is sandwiched between the first clamp segment and the second clamp segment; and
    the first clamp segment and the flange are configured together as a monolithic body.

5. The fluid conduit assembly of claim 1, wherein
    the plurality of flange apertures includes a first flange aperture, a second flange aperture and a third flange aperture;
    the second flange aperture is circumferentially between and adjacent the first flange aperture and the third flange aperture;
    the first flange aperture is located (((a quantity X)*π)/180) radians from the second flange aperture; and
    the second flange aperture is located ((((the quantity X+a quantity Y)*π)/180) radians from the third flange aperture.

6. The fluid conduit assembly of claim 5, wherein
    the plurality of flange apertures further includes a fourth flange aperture;
    the third flange aperture is circumferentially between and adjacent the second flange aperture and the fourth flange aperture; and
    the third flange aperture is located ((((the quantity X+(2*the quantity Y))*π)/180) radians from the fourth flange aperture.

7. The fluid conduit assembly of claim 1, wherein the clip is removably mounted to the second conduit coupler.

8. The fluid conduit assembly of claim 1, wherein
    the clip is configured with a multi-point aperture that at least partially corresponds to a multi-point shape having a quantity A of first points;
    the second conduit coupler is configured with a multi-point body having a quantity B of second points, and the quantity A is equal to a product of the quantity B times an integer C; and
    the multi-point body is arranged within the multi-point aperture.

9. The fluid conduit assembly of claim 8, wherein the integer C is two or greater.

10. The fluid conduit assembly of claim 8, wherein the clip aperture is located (((((the quantity A)/2)*π)/180) radians from a peak of the multi-point aperture.

11. The fluid conduit assembly of claim 1, wherein the clip aperture is a channel.

12. The fluid conduit assembly of claim 1, further comprising:
    a first fluid conduit attached to the first conduit coupler; and
    a second fluid conduit attached to the second conduit coupler;
    the second fluid conduit fluidly coupled with the first fluid conduit through a fluid coupling formed by the first conduit coupler and the second conduit coupler.

13. A fluid conduit assembly, comprising:
    a first conduit coupler;
    a second conduit coupler mated with the first conduit coupler at a threaded interface; and
    a lock configured to rotationally fix the first conduit coupler with the second conduit coupler, the lock including a flange, a clip and a fastener;
    the flange arranged with the first conduit coupler, and the flange configured with a plurality of flange apertures arranged circumferentially about an axis of the first conduit coupler;
    the clip arranged with the second conduit coupler, and the clip configured with a clip aperture; and
    the fastener mated with the clip aperture and any one of the plurality of flange apertures;
    wherein the plurality of flange apertures includes a first flange aperture, a second flange aperture and a third flange aperture;
    wherein the second flange aperture is circumferentially between and adjacent the first flange aperture and the third flange aperture;
    wherein the first flange aperture is located (((a quantity X)*π)/180) radians from the second flange aperture;
    wherein the second flange aperture is located ((((the quantity X+a quantity Y)*π)/180) radians from the third flange aperture; and
    wherein the quantity X is equal to fifteen.

14. The fluid conduit assembly of claim 13, wherein the clip is removably mounted to the second conduit coupler.

15. The fluid conduit assembly of claim 13, wherein the clip aperture is a channel.

16. The fluid conduit assembly of claim 13, further comprising:
    a first fluid conduit attached to the first conduit coupler; and
    a second fluid conduit attached to the second conduit coupler;
    the second fluid conduit fluidly coupled with the first fluid conduit through a fluid coupling formed by the first conduit coupler and the second conduit coupler.

17. A fluid conduit assembly, comprising:
a first conduit coupler;
a second conduit coupler mated with the first conduit coupler at a threaded interface; and
a lock configured to rotationally fix the first conduit coupler with the second conduit coupler, the lock including a flange, a clip and a fastener;
the flange arranged with the first conduit coupler, and the flange configured with a plurality of flange apertures arranged circumferentially about an axis of the first conduit coupler;
the clip arranged with the second conduit coupler, and the clip configured with a clip aperture; and
the fastener mated with the clip aperture and any one of the plurality of flange apertures;
wherein the plurality of flange apertures includes a first flange aperture, a second flange aperture and a third flange aperture;
wherein the second flange aperture is circumferentially between and adjacent the first flange aperture and the third flange aperture;
wherein the first flange aperture is located $(((a\ quantity\ X)*\pi)/180)$ radians from the second flange aperture;
wherein the second flange aperture is located $(((the\ quantity\ X + a\ quantity\ Y)*\pi)/180)$ radians from the third flange aperture; and
wherein the quantity Y is equal to one.

18. The fluid conduit assembly of claim 17, wherein the clip is removably mounted to the second conduit coupler.

19. The fluid conduit assembly of claim 17, wherein the clip aperture is a channel.

20. The fluid conduit assembly of claim 17, further comprising:
a first fluid conduit attached to the first conduit coupler; and
a second fluid conduit attached to the second conduit coupler;
the second fluid conduit fluidly coupled with the first fluid conduit through a fluid coupling formed by the first conduit coupler and the second conduit coupler.

* * * * *